A. SUNDH.
STEERING APPARATUS.
APPLICATION FILED SEPT. 21, 1905.

963,090.

Patented July 5, 1910.
2 SHEETS—SHEET 1.

Witnesses
Walter C. Strang
W H Carlowitz

Inventor
August Sundh
By Chas. M. Nissen.
Attorney

UNITED STATES PATENT OFFICE.

AUGUST SUNDH, OF YONKERS, NEW YORK.

STEERING APPARATUS.

963,090.

Specification of Letters Patent.   Patented July 5, 1910.

Application filed September 21, 1905.   Serial No. 279,386.

*To all whom it may concern:*

Be it known that I, AUGUST SUNDH, a citizen of the United States, residing at Yonkers, in the county of Westchester and State of New York, have invented a new and useful Improvement in Steering Apparatus, of which the following is a specification.

My invention relates to steering apparatus, particularly to steering gear mechanism for vessels, and has for its object to provide a simple and efficient means for controlling such steering gear.

A further object of my invention is the provision of improved and effective means for actuating the rudder of a vessel.

Other objects will appear hereinafter, the novel combination of elements being set forth in the claims.

Referring to the drawings, Fig. 3 is an elevational view of Fig. 1, but with different portions broken away; Fig. 4 is a plan view and Fig. 5 an elevation of an arc-shaped strip of high resistance material which may be used in place of the sectional resistance of the manually operable rheostat; and Fig. 6 is a sectional elevation of the electro-magnets constituting part of the reversing switch mechanisms and the motor-controlling device, in combination with the pneumatic apparatus to coöperate therewith.

Figure 1:
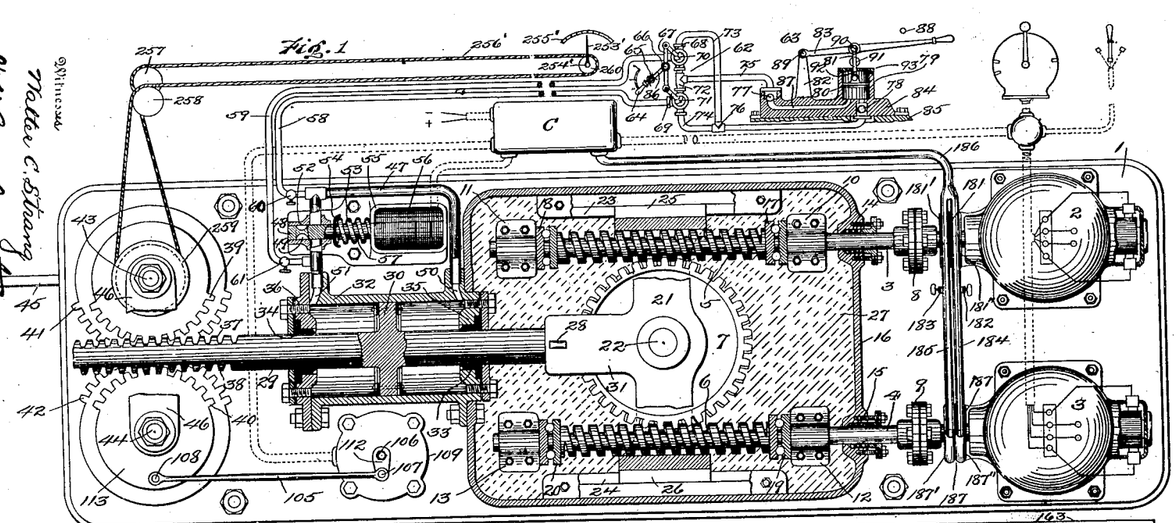
Figure 1 is a plan view, with certain portions in section and others in elevation, of the entire apparatus.

1 designates a suitable base on which the steering gear apparatus and the means for operating it are mounted. Secured to this base at the right-hand end are shown two direct current motors, 2 and 3, which are mechanically connected together through the worm shafts 3, 4, worms 5, 6, and worm wheel 7. The motor armature shafts are directly connected to the worm shafts 3 and 4 by means of the couplings 8 and 9, respectively. The worm shafts 3 and 4 pass through the stuffing boxes 14 and 15, respectively, in the casing 16 and are mounted in the fixed bearings 10, 11 and 12, 13, and also in the ball bearings 17, 18 and 19, 20. The fixed bearings prevent any lateral movement of the worm shaft while the ball bearings take up the end thrusts.

Pivoted at 22 to the cross-head 21 so as to be in mesh with both of the worms 5 and 6 is a gear wheel 7. This gear wheel, besides having a rotary movement, is also capable of having a longitudinal movement. Guides 23 and 24 are, therefore, fixed to the inside of the casing 16 and opposite each other to receive the guide shoes 25, 26 of the cross-head 21. The guides are parallel to each other, as well as to the worms so that when the worm wheel 7 receives a longitudinal bodily movement its center may have a straight line movement parallel to the worm shafts. This is for the purpose of maintaining the worms and worm wheel in proper mesh, irrespective of the position of the latter. The worms, worm wheel and guides are shown substantially in the same plane, but this relation may be varied if desired. For the purpose of lubrication the casing 16 is filled with oil as indicated by the dotted lines 27 and then entirely closed against leakage.

Rigidly connected with an extension 31 of the cross-head 21, as by means of a key 28, is shown a double ended piston rod 29, the piston 30 being adapted to be moved in the cylinder 32. The piston rod passes through stuffing boxes 33, 34 in the cylinder heads 35, 36 and is provided at its left-hand end with racks 37, 38 on opposite sides thereof. These racks mesh respectively with the segmental gears 39, 40, which are rigidly connected to the interlocking and concentrically arranged segmental gears 41, 42; that is, the segmental gears 39 and 41 are rigidly connected to the vertical shaft 43, which is mounted in fixed bearings. In a similar manner the segmental gears 40, 42 are rigidly connected with each other and mounted in fixed bearings. The upper bearings are located at the ends of the cross-piece 46, while the lower bearings are in the base 1 (see Figs. 1 and 3). The rudder 45 may be fastened to either the shaft 43 or 44, but is shown secured to the former.

It is now evident from the foregoing that when the worm wheel is moved longitudinally the racks 37, 38 will drive the segmental gears, and consequently move the rudder in one direction or the other, depending upon the direction of movement of said worm wheel.

For the purpose of regulation a by-pass 47 is placed around the piston 30 to connect the ports 50 and 51 at the ends of the cylinder, and an electrically operated valve 48 connected with said by-pass. Normally the valve is held in closed position in the valve casing 52 by means of the spring 53, which is retained in proper position by suitable means. In this instance, the spring 53 encircles the plunger 57 of the magnet solenoid 56 between the magnet frame 55 and the cup 54 which is secured to the valve stem. The valve stem is here shown integral with the plunger 57 and the valve 48. As indicated by the dotted lines in the magnet winding 56, the plunger or core 57 is allowed an inward movement sufficient to bring the circular groove 49 in the valve 48 opposite the openings in the by-pass pipe 47.

Preferably the cylinder 32 is filled with a liquid such as oil or water. Upon the energization of the magnet solenoid 56, the valve 48 will be moved to open position, so that upon the longitudinal movement of the piston 30 the fluid may circulate through the by-pass 47. When it is desired to stop the rudder, the electric motors are both run at the same speed, or both stopped altogether. The cylinder and piston apparatus is primarily for the purpose of taking the strain from the gear mechanism when the rudder is stopped, and to hold the rudder in fixed position. This result is accomplished by deenergizing the magnet which controls the by-pass valve 48, to effect a closure of said by-pass. When this occurs, the piston 30, and consequently the rudder, cannot move in either direction. That is, the piston and cylinder act as a brake or a holding device to prevent movement of the rudder. When the rudder is set to one side or the other, the pressure thereon would have a tendency to shift the mechanism, but the rudder being positively held in a fixed position, no strain is transmitted to the mechanism.

In case the worm and worm wheel mechanism become inoperative, or if the motors or motor-controlling apparatus should not operate properly, or if the current supply should fail or be turned off for some reason, the rudder may still be moved as desired by means of the hand pump 63. Although I have herein shown a hand pump, I desire it to be understood that the same may be operated by any other power than hand power, if desired.

When the rudder is to be operated by hydraulic pressure, the worm wheel 7 is moved to its extreme right-hand position, and the pin 28 removed. The magnet 56, being deënergized, the valve 48 is held in closed position by means of the spring 53. The normally closed valves 60, 61, in the pipes 58, 59, respectively, are opened and the movement of the piston 30 controlled by manipulation of the change valve 62, which is connected by the pipes 58 and 59 to the cylinder 32 at opposite sides of the piston 30.

The change valve is shown in Fig. 1 as comprising two valves 70, 71, to which are rigidly connected the arms 68, 69, respectively. A link 67 pivotally connects the outer ends of these arms and has a pin and slot connection at the central portion thereof with the hand lever 86, which is pivoted at 65, and provided with a handle 64. As indicated by the curved dotted lines, the valves 70, 71 afford communication between the pipes 59, 73, and the pipes 58, 73, respectively. When the valves are in the positions indicated, fluid, preferably oil or water, may flow from the cylinder 32 to the left of the piston 30, through the port 51, cock 61, pipe 59, valve 70, pipe 73, connection 76, pipe 74, ball check valve 78 of the pump 63, connecting passage 87, ball check valve 77, pipe 75, connection 72, valve 71, pipe 58, cock 60, pipe 47, port 50, to the other side of the piston 30, but not in the other direction, by reason of the check valve 77. By reversing the position of the lever 86, and consequently of the valves 70 and 71, the possible direction of flow of fluid from one side of the piston to the other side will be in the opposite direction. In either case the piston 80 is prevented from moving too far by the stop 88 engaging the hand lever 83.

The hand pump is shown in Fig. 1 as comprising a frame 84 fastened to a base 85, and provided with suitable ports for connection with the pipes 74, 75, and also with the ball check valves 77, 78. To a vertically extending pedestal 82 is pivotally connected at 89 the hand lever 83. At an intermediate point on this lever, is pivotally connected the link 81, which is also pivotally connected to the piston rod 92. This piston rod is rigidly connected to the piston 80, which moves in the vertical cylinder 79 and passes through an opening in the plate 93 which acts as a guide to maintain the piston rod in vertical position. This pump being of ordinary construction, its operation is obvious. For instance, in the position shown in Fig. 2, if the pump be operated fluid will be drawn from the left of the piston 30, through the pipe 59, valve 70, pipes 73 and 74, past the check valve 78, and forced past the check valve 77, through the pipe 75, valve 71, pipe 58 to the right of the piston 30. The piston 30 will therefore be moved to the left, forcing the tiller to rotate in the direction of the movement of the hands of a watch. In case the use of a pump is necessary to move the tiller, however, I prefer to fill the pipes and cylinders with water or oil, in order to have a positive and quick operation.

Figure 2:
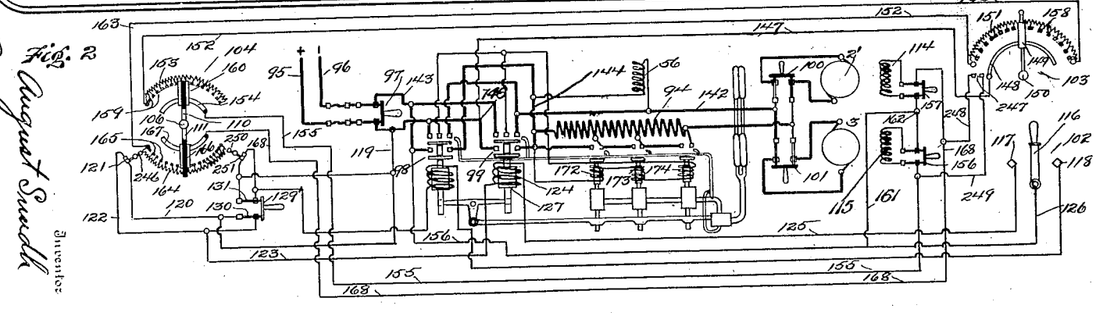
Fig. 2 is a wiring diagram of the controller shown at C in Fig. 1.

Referring now to Fig. 2—electric controlling apparatus will be described. The motor armatures 2' and 3' are connected in parallel to mains 95, 96, designated + and —, respectively, through the sectional starting resistance 94. 97 designates the main line switch and 100, 101 independent switches for the motor-armature circuits. The sectional resistance is controlled by an electro-pneumatic device which in turn is controlled by an interlocking device operated by either of the reversing switches 98, 99. The starting switch 102 controls either of the reversing switches, and the adjustable rheostat 103 controls the relative speeds of rotation of the motor-armatures 2', 3' after they have been started. The double rheostat 104 is automatically operated upon the movement of the tiller as shown in Fig. 1, the casing 109 containing this double rheostat. Motion is transmitted to the arms 110, 111 of this rheostat by means of the link 105, which is pivoted at one end 108 to the disk 113, carrying the segmental gear 40, and at its other end 107 to the crank arm 112, which is rigidly connected to the shaft 106 carrying the arms 110, 111. The purpose of the double rheostat is to equalize the fields 114, 115 of the motors after the rheostat 103 has been operated, so as to bring the rudder to a stop. Assuming the main line switch 97, and the rheostat switch 129' to be closed, let the starting switch lever 116 be moved to the left so as to connect the same with the contact 117. Current will then flow from the + main to and through the wires 119, 120, blade 130 of the switch 129', wires 122, 123, solenoid 124 of the reversing switch 99, wire 125, contact 117, lever 116, wire 126, to the — main. The core 127 of the reversing switch 99 will thereupon be lifted and also the contact plates 128, 129, carried thereby to effect a closing of the circuits to the motor-armatures.

Figures 3, 4, 5, 6:
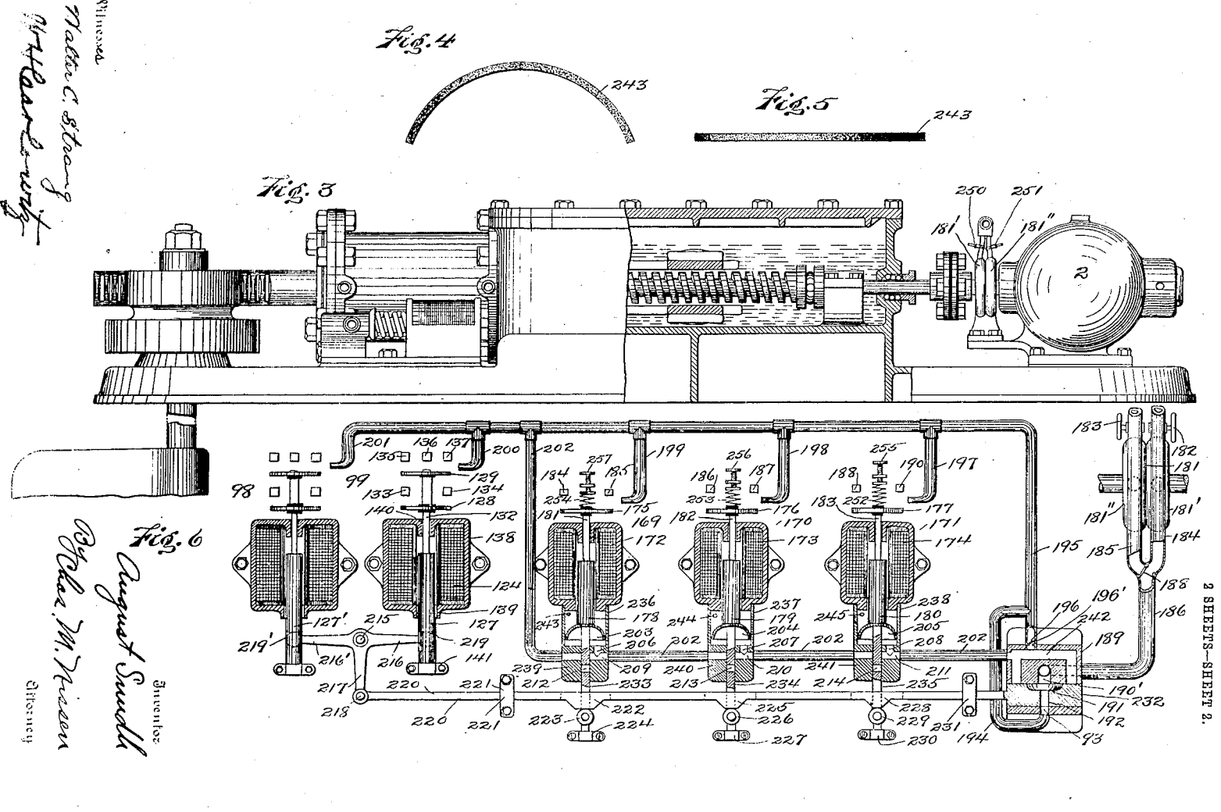

The construction of the reversing switches is clearly shown in Fig. 6. The solenoid 124 is incased in the magnetic frame 138 which is provided with a lower opening 139 to allow free movement of the core or plunger 127, and an upper opening 140 for the stem 132, which rigidly connects the contact makers 128 and 129, so as to move with said plunger. These contact makers are insulated from the stem 132 and from each other, and are adapted to electrically connect the contacts 133, 134, and 135, 136, 137 respectively. A stop 141 is fixed in the line of movement of the plunger to limit its downward movement. The means for controlling the sectional resistance 94 is also shown in Fig. 6. Upon the operation of the reversing switch 99, a circuit may be traced from the + main, through the circuits indicated by the heavy black lines, back to the — main by way of the stationary contacts 133, 134, and contact maker 128 of the reversing switch 99, sectional resistance 94, motor-armature switches 100, 101 and motor-armatures 2', 3' in parallel, wire 142, upper contacts 137, 135 and upper contact maker 129, and wires 143, 96. A circuit is also established from the wire 144 to the wire 142, through the brake magnet 56, thus connecting the brake magnet directly across the mains. Also substantially at the same time circuits are established through the fields 114, 115 in parallel. This circuit may be traced from the connection 146, through the wire 147, the arc-shaped contact strip 148, wiper 149, which is pivotally connected at 150, one of the contacts 158, the left-hand portion of the sectional resistance 151, wire 152, the left-hand portion of the resistance 153, one of the contacts 159, wiper 160 on the arm 110, arc-shaped strip 154, wire 155, the lower blade of switch 156, shunt field coil 115, upper blade of the field switch 156, wires 161, 142, to the — main. The parallel circuit extends between the contact 158, which the wiper 149 engages, and the point 162 between the switches 156, and 157, and passes through the right-hand portion of the resistance 158, wire 163, left-hand portion of resistance 164, wiper 166, contact strip 167, wire 168, the upper blade of the field switch 157, shunt field coil 114 of the other motor and the lower blade of said switch 157. Therefore, upon the operation of the reversing switch the fields are excited, the brake released, and current sent through the armature of the motors to start the same. As shown in Fig. 2, however, the current through the armatures is limited by the resistance 94, which must now be cut out gradually, or step-by-step, in order to increase the speed of the motors. This is accomplished by means of accelerating magnets and switches 169, 170, 171 (Fig. 6) whose solenoids are designated by the reference numbers 172, 173 and 174. These magnetic switches are provided with plungers 178, 179 and 180, to which are rigidly connected the contact disks 175, 176 and 177 by means of the stems 181, 182 and 183, respectively. The contact disks 175, 176 and 177 are adapted to electrically connect the contacts 184, 185 and 186, 187 and 188, 190, respectively.

When the reversing switch 99 operates as heretofore explained, a circuit is closed through the solenoids 172, 173 and 174 in series from the + main to the contact 136, contact maker 129 and thence to the negative main. The accelerating magnets are therefore connected directly across the mains and not across the motor-armature terminals as is usual. The accelerating magnets are therefore kept at constant strength, but are so wound that they cannot alone lift their cores, but must be assisted by some outside force. This assistance is rendered in this instance by means of pneumatic controlling apparatus which operates to cause portions of the resistance 94 to be successively short-circuited as the motors increase in speed.

On each armature shaft is mounted a double fan, blowers 181 and 187, so constructed and arranged that although the motors operate in reverse directions, currents of air will be propelled by each and led in the same direction through the pipes 184 or 185, and 186. That is, the blowers are so constructed that if the motors 2 and 3 rotate in a certain direction, but in opposite directions, the blowers 187' and 181' will each propel air along the pipe 185 into the pipe 186, while the blowers 187" and 181" will be ineffective and the valve 188 held in the position shown in Fig. 6. When both motors are reversed, the valve 188 will be moved to its opposite position to close communication from the blowers 187' and 181', which now become ineffective, while the blowers 187" and 181" will propel the fluid along the pipe 184 to the pipe 186. Should either motor become inoperative so that only one can be used, or if it is desired to employ only one motor, the blowers connected to the motor not operating must be cut off. This is done by means of cocks or valves in the pipes connected to said blowers. For instance: if only the motor 2 is run, the valves 183 and 182 are closed, while if only the motor 3 is driven, the valves 183 and 182 are left open, but the valves 251 and 250 (Fig. 3) closed.

When the motors begin to revolve, a current of air is propelled which passes from the pipe 186 to the port 190', and thence to and through the cross-opening 192 in the valve 232, port 93, by-pass 194, pipe 195, and pipes 197, 198, 199, 200 and 201. The last-named pipes have nozzle-shaped ends bent to direct currents of air horizontally between the contacts and disks of the accelerating magnet switches and between the upper contacts and upper contact-makers of the reversing switches. These currents of air playing on the contacts and disks, not only blow out any arcs that may form when the circuits are broken at these points, but also keep the contacts and disks cool and free from dust.

Even though the accelerating magnets were of sufficient strength to alone raise their contact disks, they are prevented from doing so by the interlocking device controlled by the reversing switches. A double bell-crank lever is pivoted at a fixed point 215. The horizontal arms 216 and 216' engage recesses 219 and 219', respectively in the plungers 127 and 127' of the reversing switches 99 and 98. The disk-shaped ends of the arms and the said recesses are clearly shown in dotted lines in Fig. 6.

Pivoted at 218 to the vertical arm 217 of the double bell-crank lever is a rod 220, to the right-hand end of which is secured the valve 232. This rod moves in suitable guides 221, 231 between which are the cams 222, 225 and 228. Connected rigidly with the plungers 178, 179, 180 of the accelerating magnets are downwardly extending valve rods 233, 234, 235, respectively, to the lower ends of which are pivoted the antifriction rollers 223, 226, 229. The downward movements of the valve rods are limited by the stops 224, 227, 230, and the upward movement is prevented by the rollers 223, 226 and 229, engaging the lower portion of the cams 222, 225 and 228, respectively. The valve rods may extend to one side of the cams, pass through slots therein, or be constructed so as to encircle said cams. It will be understood that the weight of each of the magnet cores 127, 127' is sufficient when its magnet is deënergized to return the bell-crank lever to normal position, and also the rod 220 against any resistance that may be offered by the rollers 223, 226 and 229.

To the lower side of the accelerating magnet frames are connected the piston cylinders 236, 237, 238, and below these the valve casings 239, 240, 241, respectively. Between the plunger and valve rods are placed pistons 203, 204 and 205, cup-shaped leather pistons in this instance, which are adapted to move in the piston cylinders.

A pipe 202 made up of sections, is connected between the chamber 242 of the main valve casing 189 and the pipe 195 between the pipes 199 and 200. This pipe connects also the passages 209, 210 and 211 with each other, but these passages are normally closed at their central portions by means of the valve rods 233, 234 and 235, respectively. When the valve ports 212, 213 and 214, however, register with the passages 209, 210 and 211, respectively, air will pass through the pipe 202 provided the valve 232 is in proper position. It will also be noted that ports 206, 207 and 208 lead from the passages 209, 210 and 211, respectively, to the piston cylinders 236, 237 and 238, beneath the pistons 203, 204 and 205.

When the reversing switch 99 operates, the double bell-crank lever is rotated counter clockwise and the rod 220 and valve 232 therefore moved to the right. The plungers are then free to move upwardly, but are unable to do so unless energized and assisted by the pneumatic apparatus. It will be seen that the valve 232 is provided with a cup-shaped recess 191 of sufficient length to bring the valve chamber 242 and port 190' into communication when the valve 232 is moved either to the right or left. This operation closes the port 93, but air is still forced through the pipe 195 by way of port 196. A check valve 196' which opens upwardly permits the passage of air through the port 196 to the pipe 195, but prevents a flow of air in the reverse direction, and thus cuts off communication between the pipes 186 and 202 by way of the by-pass 194. The air pressure exerted through the extreme right hand section of the pipe 202 and port 208 acts on the piston 205 and moves the plunger 180 upwardly until the valve port 214 registers with the passage 211 and the contact disk 177 is brought into engagement with the contacts 188 and 190. Air pressure then begins to be exerted on the piston 204 to move the contact disk 176 into contact with the contacts 186 and 187. In so doing the valve rod 234 is moved upwardly until valve port 213 registers with the passage 210 and air may be forced to the piston 203. This will effect the connection of the contacts 184 and 185 in a similar manner when air may pass freely through the pipe 202 to the nozzles opposite the contacts. This relieves the pressure on the pistons, but the magnets alone are sufficient to hold the contact disks in their upper positions after having been once placed there.

The piston cylinders 236, 237 and 238 are provided with openings 243, 244 and 245, respectively, for the purpose of facilitating the movement of the pistons in an obvious manner. These holes may be omitted if desired and the air allowed to escape from above the pistons through the space between the plungers and stems and the magnet frames. Furthermore, the pistons are made very loose fitting in order to insure a quick dropping of the plungers when the reversing switch magnet is deënergized and the cam rod 220 drawn to the left.

The construction as described is fully operative to start up the motor and accelerate the same to full speed. It is apparent, however, that the blowers will propel a current of fluid which will have a pressure dependent upon the speed of the motor to which it is connected. That is, the pressure on the pistons 203, 204 and 205 will vary with the combined speed of the motors. In order to take advantage of this fact, I construct the accelerating switches in such manner that greater pressure is required on the piston 204 than on the piston 205 to close the respective switches actuated thereby. Although various means may be employed for effecting a successive operation of the switches 171, 170 and 169 I have illustrated only one form of this feature of my invention in that I have provided springs 252, 253, 254 with means 255, 256, 257, respectively, for adjusting the tension of the same. The spring 252 is made the weakest and the spring 254 the strongest. Weights may be substituted for the springs, if desired. Furthermore, with this arrangement the electromagnets 174, 173 and 172 may be omitted and also the interlocking device in which even as the motor starts and increases in speed the fluid pressure will be correspondingly increased and the motor gradually brought up to full speed. I prefer, however, to use the interlocking apparatus in conjunction with the pneumatic apparatus for the reason that the piston 205 or 204 or both may stick while the piston 203 would be moved to close its electric switch. This would effect a cutting out of the entire starting resistance 94 before the motors have acquired sufficient speed, and therefore the motor armatures would probably be injured by an excess of current.

Having run both the motors up to full speed, suppose it is desired to change the position of the rudder. Normally the worm shafts 3 and 4 rotate in opposite directions at the same rate of speed. This causes the worm wheel 7 to simply rotate about a relatively fixed point or center 22. But if the speed of either motor is increased or decreased, the worm wheel will receive also a longitudinal bodily movement. For instance: if motor 2 moves in a clockwise direction as viewed from the right-hand end of Fig. 1 faster than the other motor 3 moves in an anti-clockwise direction, the worm wheel 7 will move to the right a distance proportional to the difference between the speeds of the two motors. So long as one of the reversing switches 98 or 99 is in its contact-engaging position the valve 48 is in its open position to allow a free flow of fluid through the by-pass 47, otherwise, any increase of speed of one motor over that of the other would be prevented by the fluid in the cylinder 32. If the worm wheel 7 moves to the right as has been assumed, the rack 37 on the piston rod 29 will rotate the gear 39 and consequently the rudder 45 in an anti-clockwise direction when looking down at the left-hand portion of Fig. 1.

The means for varying the relative speeds of the motor armatures 2' and 3' are shown in Fig. 2 and comprise rheostats 103 and 104 for changing the excitation of the fields of the motors. The fields are of the same strength when the wipers 149, 160 and 166 are in their central positions as shown, as in this case the same amount of resistance is in series with each field coil.

Let it be assumed that the wiper 149 is moved toward the left so as to increase the resistance on one side and decrease it on the other. It will be remembered that in tracing the circuits through the field coils 114 and 115 in parallel the wiper 149 was the beginning of the parallel circuit which continues through the wires 152, 163, rheostat 104, wires 155, 168, and thence to the field coils. More resistance is now placed in series with the field coil 114 and an equal amount taken from in series with the field coil 115. The field coil of motor 2 having been weakened will increase in speed while that of motor 3 having been strengthened will decrease in speed. This difference in the speeds of the two motors produces a longitudinal movement of the worm wheel 7 as before pointed out. The ratio of the speeds of the motors may be made anything desired and this ratio may be more gradually varied by means of the carbon resistance strip 243 shown in Figs. 4 and 5 which may be substituted for the sectional resistance in the rheostats 103 and 104.

As before explained, when the rudder is moved the shaft 106 connected to the disk 113 is also moved and is moved in such a direction that the field excitations are equalized, that is, it is moved until the same amount of resistance is again placed in series with each field, whereupon each of the motors will again rotate at the same speed as the other, and the rudder will discontinue its movement and will be held stationary. For instance, if the wiper 149 is moved to the left to increase the speed in a clockwise direction of motor-armature 2' and decrease that of motor-armature 3' in the opposite direction, so that the worm wheel 7 will move toward the right, the shaft 106 of the rheostat 104 will be moved clockwise and consequently more resistance 153 will be inserted between the wires 152 and 155 and a portion of the resistance 164 cut out. The sum of the resistances in series respectively with the field coils will now be the same and the armatures will rotate at the same rate of speed. This is made clear by a tracing of the parallel circuit from wiper 149 through the arms of the resistance 151 of the manual rheostat 103, wires 152, 163, resistances 153, 164 of the automatic rheostat 104, wipers 160, 166, wires 155, 168, and field coils 115, 114, as before.

Should the rudder move beyond its intended extreme end of movement the arm 111 of the rheostat 104 would strike against the pivoted lever 246 and the open contacts 121. The switch 129 being in open position, the opening of the contacts 121 would cause a deënergizing of the solenoid 124 and therefore a cutting off of the current from the motors and from the magnet 56. The bypass valve 48 will thereupon be closed and the piston in the brake cylinder will act as a brake to stop the steering apparatus and hold the rudder at the extreme end of its travel. This will occur only when the wiper 149 has been moved to its extreme left-hand resistance-engaging position and the rudder moves too far as by reason of the momentum which it has acquired. If the switch 129' is closed, however, the limit switches 121 and 251 would be inoperative as the blades 130 and 131 are respectively in parallel with said limit switches.

Ordinarily, after the reversing switch 102 has been closed it may be left in closed position and the steering gear controlled by means of the manual rheostat 103 alone. In this case it should be noted that the valve 48 is held open and therefore in stopping the momentum of the rudder and parts connected directly thereto may be so great as to produce an injurious strain on the gear mechanism. To avoid this the switch 102 may be brought to open position whereupon the valve 48 will be closed and the hydraulic brake made effective to stop the apparatus and hold the rudder in fixed position. Furthermore, if the switch 129' is left closed, thus rendering the limit stops 121, 251, inoperative, the rudder may turn beyond its intended limit of movement and not only injure the gearing mechanism but also the rudder itself and its connections with the ship. It is therefore preferable to maintain the switch 129' in open position.

Should one of the limit switches 121 or 251 be operated to open the circuit to the reversing switch last operated the electric controlling apparatus will be restored to normal, the motors stopped, and the hydraulic brake operated. To release the rudder and move it back toward normal position, the switch 129' may be closed to establish a circuit through the reversing switch magnet and operate the same to release the hydraulic brake and start the motors. The wiper 149 may then be moved toward its central position to regulate the motors and cause them to move the rudder toward its central position. Preferably however, the wiper 149 is moved to an intermediate position before the switch 129' is closed, to insure against the rudder being moved still farther to one side. In operating the two motors together, their direction of rotation is never reversed, as the direction of movement of the rudder is determined and controlled by the relative speed of the motors. If the motors were reversed, the automatic means for balancing the resistance in the motor fields would be inoperative, as a movement of the wiper 149 in either direction would now cause a relative movement of the motors in such a direction that the rheostat 104 would still further unbalance the field circuits. The position of the switch arm 116 necessary for a proper operation of the rheostat 104, may readily be determined by experiment, and then retained in such position as long as both motors are operated.

Should one of the motors become inoperative it may be disconnected and the other motor used alone in which event the wiper 149 is brought to its extreme left-hand position to connect the contacts 247 and the motor controlled entirely by means of the switch 102. In thus operating the steering mechanism with one motor it is more necessary to have the switch 129' in open position so that the limit switches 121 and 251 will be effective to automatically stop the rudder at the limit of its travel. As a further safeguard the indicator comprising the pointer 253' (Fig. 1) may be used to prevent the rudder from being moved too far. It should be noted that when the wiper 149 is moved to its left-hand limit to connect the contacts 247 all resistance is cut out from in series with the field coils 114, 115 and the connected motor will run at its minimum speed. When only one motor is used the armature switch 100 or 101 and the field switch 157 or 156 of the other motor are opened. Also, whenever the motor is stopped the hydraulic brake is operated to stop and hold the rudder. If desired the motor shafts could be provided with brake pulleys and brake-applying means adapted to be released by electro-magnets connected across the main line in parallel to the solenoid 56 and deënergized in the same manner.

In order to indicate the position of the rudder particularly when one motor alone is used or when hydraulic pressure is relied upon to actuate the rudder, I have provided an indicator comprising a pointer 253' which is pivoted at 254' an adapted to move over a graduated arc 255'. The pointer 253' is secured to a pulley 260 which is belted to an additional pulley 259 which is fastened to the shaft 43. The belt is herein shown in the form of a rope 256' passing over the direction pulleys 257' and 258 as well as around the pointer pulley 260 and the rudder-post pulley 259. Any other form of indicator than the one shown may be employed if desired.

Having thus fully described my invention and without limiting myself to any of the details of construction herein disclosed what I claim and desire to have protected by Letters Patent of the United States is:

1. The combination with a motor, of motor-controlling devices, a blower connected to the motor, and means for directing and controlling the fluid propelled by said blower for successively operating said motor-controlling devices as the motor accelerates.

2. The combination with a motor, of motor-controlling means, a double blower connected to the motor, and means for directing and controlling the fluid propelled by said blower for operating said motor-controlling means.

3. The combination with a motor, of motor-controlling means, a double blower driven by said motor, and means for directing fluid propelled by said blower to effect the operation of said motor-controlling means.

4. The combination with a motor, of motor-controlling devices, a blower connected to the motor, and means for directing fluid propelled by said blower to successively operate said motor-controlling devices, the operation of each motor-controlling device being dependent upon a fluid pressure produced by a predetermined speed of said blower.

5. The combination with a motor, of a plurality of motor-controlling devices, means for propelling and directing fluid to effect the operation of said motor-controlling devices, and interlocking mechanism controlled by the speed of the motor for effecting the successive operation of said motor-controlling devices.

6. The combination with a motor, of reversing switches therefor, accelerating means for said motor, means for operating said accelerating means, a mechanical locking device to normally prevent the operation of said operating means, and means actuatable by said reversing switches for releasing said locking device.

7. The combination with a motor, of motor-controlling means comprising a plurality of switches, means for closing said switches, means of different strengths for holding said switches normally in open position, means dependent upon the speed of the motor for propelling fluid, and means for directing said fluid to said switch-closing means to effect the successive closing of said switches as the motor increases in speed.

8. The combination with a motor, of reversing switches therefor, starting resistances, a plurality of switches for cutting out said starting resistances, locking mechanism for holding said switches in open position, means connected with the reversing switches for releasing said locking mechanism, and pneumatic apparatus dependent upon the speed of the motor for effecting a successive operation of said switches to gradually cut off the starting resistances.

9. The combination with a motor, of motor-controlling means comprising a plurality of switches, a plurality of piston motors one connected with each of said switches, and means controlled by the first named motor for normally actuating said piston motors successively.

10. The combination with a motor, of motor-controlling means comprising a plurality of switches, means connected with the motor for propelling fluid and means for directing said fluid to said switches to keep the same clean and to blow out any arcs that may form.

11. The combination with a motor, of motor-controlling means, means for operating said motor-controlling means, means operated by the motor for propelling fluid, means for directing said fluid to said operating means, a valve for controlling said directing means, reversing mechanism for the motor, and means operated by said mechanism for operating said valve.

12. The combination with an electric motor, of a plurality of switches controlling the motor, a piston motor connected to each of said switches, means of different strengths for holding the said switches and the pistons in normal position, and means for exerting pressure on said pistons varying with the speed of said electric motor to effect a successive closing of said switches.

13. The combination with a plurality of switches, of piston motors for operating said switches, means for exerting fluid pressure on the pistons, and retarding means for said piston motors to insure the successive operation of said switches.

14. The combination with a plurality of switches, of motors for operating said switches, locking mechanism for holding said switches normally in open position, means for releasing said locking mechanism, fluid-propelling and directing means for effecting a successive operation of said switches.

15. The combination with a plurality of switches, of motors for operating said switches, locking mechanism for said motors, fluid-propelling means, means for directing fluid to said motors, a valve for said directing means, and means for releasing said locking mechanism and actuating said valve.

16. The combination with a plurality of electric switches, of means for operating the same, locking mechanism for normally holding said operating-means inoperative, fluid propelling means, means for directing the fluid to said operating-means, a normally closed valve for said directing-means and connected to said lock mechanism, and means for releasing said lock mechanism whenever said valve is opened.

17. The combination with an electric switch, of means for operating said switch, fluid-propelling means, means for directing fluid to said operating means, means for controlling said directing means, and means for directing a substantially constant flow of fluid to the switch contacts to keep the same clean and to blow out arcs.

18. The combination with an electric motor, of reversing switches therefor, a starting resistance, a plurality of switches for cutting out said starting resistance, motors for operating said switches, locking mechanism for said motors, means actuated by said reversing switches for actuating said locking mechanism, a source of fluid-pressure supply, and valve mechanism for controlling the fluid pressure to effect a successive operation of said motors and switches.

19. The combination with an electric motor, of reversing switches therefor, sectional starting resistance, a plurality of electric switches for varying said resistance, a plurality of motors one for each of said switches, a source of fluid-pressure supply controlled by said electric motor, means for directing the flow of fluid to said motors for the switches, and valve mechanism for effecting a successive operation of said motors and switches, locking mechanism for said motors, and means operated by either of the reversing switches for actuating said locking mechanism.

20. The combination with a motor, of starting resistance therefor, switches for controlling said starting resistance, means dependent upon the speed of the motor for propelling fluid, motors for operating said switches, means for directing and controlling the flow of fluid to said last-named motors for effecting a successive operation of said switches, and a gradual cutting off of said resistance, and electro-magnets connected across the mains for holding said switches in closed position.

21. The combination with a plurality of electric motors, of motor-controlling means therefor, means connected with said motors, and operating with a speed proportional to the speed of the motors, for propelling fluid, and means operated by said fluid for actuating said controlling means.

22. The combination with two motors arranged to rotate in opposite directions, of motor-controlling means, and fluid pressure apparatus controlled by said motors for operating said motor-controlling means.

23. The combination with two motors operated in opposite directions, of motor-controlling means, means for operating said motor-controlling means, and means operated by said motors for propelling fluid, and means for directing the fluid to said operating means to actuate the same.

24. The combination with two motors connected in parallel and to operate in opposite directions, of motor-controlling means, means for operating said motor-controlling means, a blower for each motor and driven thereby, means for directing and controlling the pneumatic pressure to actuate said operating means.

25. The combination with a plurality of motors, of differential mechanism operated thereby, motor controlling means, means for operating said motor-controlling means, a source of fluid pressure, and means for directing and controlling said fluid pressure to effect the actuation of said operating-means.

26. The combination with motors, of differential gear mechanism, starting apparatus for said motors, fluid pressure mechanism connected to the motors for controlling said starting mechanism, and means for varying the relative speeds of said motors at will.

27. The combination with a driven shaft of two electro-dynamic machines, automatic means for controlling the acceleration of said machines, differential gearing connecting such machines with said shaft, and means for automatically and simultaneously increasing the strength of the field-magnet of one machine and decreasing the strength of the field-magnet of the other machine.

28. The combination with a driven shaft, of two electro-dynamic machines, a differential gearing connecting such machines with the shaft to be driven, means for manually varying the strength of the field-magnets of such machines, means for automatically varying such field strengths and automatic accelerating mechanism for said machines.

29. The combination with a driven shaft, of two electric motors, automatic accelerating mechanism for said motors, differential gearing connecting such motors to the shaft to be driven, means for manually varying the field strengths of said motors to change the relative speeds of said motors, and automatic means for thereafter varying such field strengths to cause the motors to again run at the same speed.

30. The combination with two motors, of differential gearing, electro-pneumatic controlling apparatus for said motors, a motor switch for varying the relative speeds of said motors, a balancing switch for equalizing the speeds of the motors, and means for operating said balancing switch.

31. The combination with a plurality of motors, of differential gearing, motor acceleration and controlling means, a manual switch for varying the relative speeds of said motors, a balancing switch equalizing the speeds of said motors, and means for operating said motors.

32. The combination with a plurality of motors, of automatic controlling and accelerating means therefor, means for varying the relative speeds of said motors, and means for automatically equalizing the speeds of said motors.

33. The combination with two motors connected to run in opposite directions, of automatic accelerating and controlling means for said motors, means for strengthening the field of one motor and weakening the field of the other, and means for automatically equalizing the strength of said fields.

34. The combination with two motors connected to run in opposite directions, of automatic accelerating and controlling means, a motor switch for simultaneously inserting resistance in circuit with the field of one motor and removing resistance from in circuit with the field of the other motor, and an automatic switch for equalizing the amount of resistances in circuit with the motor fields.

35. The combination with two motors connected to run in opposite directions, of motor-controlling and accelerating means, a manual rheostat for simultaneously increasing the resistance in circuit with one field magnet and decreasing the resistance in circuit with the other field magnet, and an automatic double rheostat for equalizing the amounts of resistance in circuit with said field magnets.

36. The combination with two motors, of differential gearing connected thereto, electro-pneumatic apparatus for starting said motors and accelerating the speed thereof, a manual rheostat for increasing the field strength of either motor and decreasing that of the other, and an automatic double balancing rheostat for equalizing the field strengths.

37. The combination with a plurality of motors, of differential gear mechanism associated therewith, reversing switches for said motors, means for controlling the acceleration of the motors, means for increasing the field strength for one motor, and decreasing the field strength for the other, and means for equalizing the field strength of the motors.

38. The combination with steering mechanism of a plurality of motors, means for controlling said motors together, or any one alone, fluid propelling means, fluid directing means, and means acted upon by said fluid for operating said controlling means.

39. The combination with differential gearing, of motors therefor, motor-controlling means, a manual rheostat for effecting a variation in the relative speeds of said motors, a manual switch for effecting a starting of said motors, and circuits and connections permitting the use of said motor controlling means when only one motor is employed, to start, stop and reverse the last named motor.

40. The combination with a driven shaft, of two motors, differential gearing connecting said shaft and motors, motor-controlling means for varying the relative speeds of said motors to effect a movement of said shaft in either direction, and circuits and connections permitting the operation of either of said motors alone to control said shaft.

41. The combination with two motors, of a driven shaft, of differential mechanism connecting said motors to said shaft, motor-controlling means comprising electric reversing switches and accelerating apparatus, a rheostat switch for varying the relative speeds of said motors to effect a movement of said shaft in either direction, and circuits and connections co-acting with said motor-controlling means for operating one motor alone to control said shaft if the other motor becomes inoperative.

42. The combination with a driven shaft, of motors, differential mechanism between said shaft and said motors, means for starting and accelerating said motors, means for varying the relative speeds of said motors to control said shaft, and means permitting the use of said starting and accelerating means for operating one motor alone to control said shaft in case the other motor is disconnected.

43. The combination with two differentially acting motors, of starting and accelerating apparatus therefor, electric reversing switches for said motors, means for varying the relative speeds of said motors, means for controlling said reversing switches, and means for disconnecting either motor so the other may be operated alone.

44. The combination with a plurality of motors, of differential gearing operated thereby, controlling means for the motors, means for varying the relative field strengths of said motors, means for equalizing said field strengths, and limiting means operated by said equalizing-means to stop the motors.

45. The combination with two motors connected to run in opposite directions, of motor controlling apparatus, a rheostat switch for changing the relative strengths of the field magnets of said motors, an automatic double rheostat for equalizing the strengths of said field magnets, limit switches operated by said automatic rheostat for stopping said motors, and means for controlling the circuits of the limit switches to permit the re-starting of said motors.

46. The combination with a body to be driven, of a plurality of oppositely rotating motors operatively related thereto, starting apparatus for throwing said motors into operation, means for varying the relative speeds of said motors to control the said driven body, a brake for positively stopping said body, and means for controlling said brake.

47. In steering apparatus, the combination with a plurality of electric motors, of a rudder connected to a vessel, differential mechanism operatively connected between said motors and rudder, means for controlling said motors from a convenient distance, and a hydraulic brake for positively stopping said rudder and holding the same in fixed position.

48. The combination with two motors connected to run in opposite directions, of means for automatically controlling the accelerating of said motors, means for varying the relative speeds of said motors, a body to be moved, differential mechanism and connections between said body and said motors, and means positively actuated by the moving body for effecting an equalization of the speeds of said motors.

49. In an electric steering device, electric motors, means for controlling the armature windings of the motors, differential mechanism and connections between said motors and the rudder, means for varying the speeds of said motors, means for restoring the speeds of said motors to normal, and positive connections between the rudder and the restoring means to effect an automatic operation of the latter.

50. The combination with a plurality of motors, of differential mechanism operated thereby, and comprising worm and worm gear mechanisms, a rudder, and gear and rack connection between said differential mechanism and said rudder.

51. The combination with two motors connected to run in opposite directions, of worms driven by said motors, a worm wheel meshing with both of said worms, a rudder, and connections between said worm wheel and said rudder.

52. The combination with an electric motor and motor-controlling means, of a worm connected to the shaft of the motor, a worm-wheel meshing with said worm, a reciprocating member connected to said worm-wheel, said reciprocating member being provided with a double rack, segmental gears meshing with said racks, additional segmental gears meshing with each other and rigid respectively with the first-named segmental gears, and a rudder connected to move with said gears.

53. The combination with a reciprocating member, of means for moving said member at will, gears meshing with racks on said member, additional gears meshing with each other and secured to said first-named gears, and a rudder connected to be moved when said gears are moved.

54. The combination with two motors, of means for controlling said motors, worms connected to the shafts of said motors and arranged substantially parallel with each other, a worm-wheel in mesh with both of said worms, a cross-head carrying said worm-wheel, guides for said cross-head, a casing inclosing said worms, worm-wheel, cross-head and guides, a reciprocating member connected to said cross-head, a rudder, and connections between said shaft and rudder.

55. The combination with a plurality of motors, of motor-controlling means, differential worm-gearing connected to said motors, a casing inclosing said gearing and arranged to contain a lubricant for said gearing, a body to be moved, and connections between said gearing and said body.

56. The combination with differential gearing, of motors for operating the same, a hydraulic motor detachably connected to said gearing, a body to be moved, connections between said body and said motor, means for controlling said motor to act as a brake when connected to said gearing, and means for operating said motor to effect the desired movement of said body when said motor is disconnected from the gearing.

57. In steering apparatus for a vessel, the combination with gear mechanism, of means for operating said mechanism, a motor connected with said mechanism, means for controlling said motor to act as a brake, and means for positively actuating said motor independently of said operating-means to effect the steering of the vessel.

58. The combination with differential gear mechanism, of means for operating said mechanism, a rudder, a reciprocating member detachably connected with said mechanism, connections between said member and rudder, a motor connected with said member, means for controlling said motor to operate as a brake when said member is connected to the gear mechanism, and means for effecting the operation of said motor to move and control the rudder when said motor is disconnected from said gear mechanism.

59. The combination with two motors, of gear mechanism connected thereto, a reciprocating member connected to said gear mechanism, a rudder, and means operated by said reciprocating member for moving said rudder, said gear mechanism effecting a movement of the rudder when one of said motors operates at a greater speed than the other, or when only one motor operates.

60. The combination with gear mechanism, of a reciprocating member detachably connected to said gear mechanism, a body to be moved, operative connections between said body and said reciprocating member, one or more motors connected to said gear mechanism to effect the operation of said member, an additional motor connected with said reciprocating member, means for controlling said additional motor to act as a brake when said member is connected to the gear mechanism, and manually controlled means for actuating said motor to operate said body independently of said gear mechanism and first-named motors when said member is disconnected from said mechanism.

61. The combination with a rudder, of brake associated with said connections, a tween said mechanism and said rudder, a brake associated with said connections, a valve for controlling said brake, means for actuating said valve, and means for actuating said gear mechanism to effect the desired movement of said rudder.

62. In steering apparatus, the combination with a rudder, of a piston brake for stopping said rudder, a by-pass around the piston, a valve normally locking said piston in fixed position, means for moving said piston and rudder, one or more motors for operating said moving means, and means for unlocking said valve when one or more or all of said motors are started.

63. In steering apparatus, the combination with a cylinder, of a piston in said cylinder, a rudder, connections between the piston rod and the rudder, means for stopping said piston and holding the same in substantially fixed position, differential gear mechanism connected to said piston, one or more electric motors for operating said gear mechanism, and means for controlling said motors and said piston-stopping-means.

64. In steering apparatus, the combination with differential gearing connected to the rudder of the vessel, of two motors connected to rotate normally at equal speeds and to operate said gearing, means for varying the relative speeds of said motors to effect the desired movement of said rudder, and means mechanically connected to said rudder for bringing said motors back to equal speeds upon the movement of the rudder.

65. The combination with a rudder of a vessel, of two motors connected to run in opposite directions at the same speeds, connections between said motors and said rudder, a rheostat switch for varying the relative speeds of said motors to effect a movement of said rudder, an additional rheostat switch for equalizing the speeds of said motors, and means for cutting out both of said rheostat switches to permit the operation of either motor alone to control said rudder.

66. In steering apparatus for ships, the combination with electric motors and controlling apparatus therefor, of a rudder, mechanism driven by the motors for actuating the rudder, and hydraulic means for holding the rudder at rest.

67. In steering apparatus for ships, the combination with electric motors and controlling apparatus therefor, of a rudder, mechanism to be driven by the motors for actuating the rudder in either direction from a central position, and hydraulic means to hold the rudder positively against movement when the same is not being shifted by the motors.

68. In steering apparatus for ships, the combination with mechanism for actuating the rudder, of an electric power device for actuating said mechanism, means to control said electric power device, and hydraulic apparatus for holding the rudder when said power device is not in operation, whereby same can be shifted only by the mechanism when actuated by the electric power.

69. In steering apparatus for ships, the combination with electric motors and controlling apparatus therefor, of a rudder, a differential mechanism to be driven by the motors for actuating the rudder, and hydraulic means to hold the rudder when the same is not being actuated by the differential mechanism.

70. In steering apparatus for ships, the combination with a rudder, of two electric motors, differential mechanism to be driven by said motors for actuating the rudder, and hydraulic means to hold the rudder when same is not being actuated by the differential mechanism, controlling means for the motors, and controlling means for the hydraulic apparatus operated in conjunction with the motor-controlling means.

71. In steering gear apparatus for ships, the combination with two motors, of a screw actuated by each motor, said screws operating in opposite directions, a worm wheel engaging said screws, a rudder, intermediate mechanism between the rudder and said worm wheel, comprising a hydraulic holding device adapted to hold the mechanism at rest so that the same cannot be actuated by the rudder, and means for controlling the mechanism at will.

72. In steering gear apparatus for ships, the combination with two motors, of a screw actuated by each motor, said screws operating in opposite directions, a worm wheel engaging said screws, a rudder, intermediate mechanism between the rudder and said worm wheel, comprising a hydraulic holding device adapted to hold the mechanism at rest so that the same cannot be actuated by the rudder.

73. In steering gear apparatus for ships, the combination with electric motors and controlling apparatus therefor, of a rudder, mechanism driven by the motors for actuating the rudder, hydraulic means to hold the rudder positively when the same is not being shifted by the motors, and manually operable emergency means for actuating the rudder by said holding means if the electrical apparatus should be out of order.

74. In steering apparatus for ships, the combination with electric motors and controlling mechanism therefor, of a rudder, differential mechanism driven by the motors for operating the rudder, a hydraulic device for holding the rudder positively against movement when the same is not being operated by the motors, a manually operable emergency means for operating the rudder by said hydraulic device when either the electrical apparatus or the differential mechanism is out of order.

75. In steering gear apparatus for ships, the combination with electric motors and controlling apparatus therefor, of a rudder, mechanism to be driven by the motors for actuating the rudder, hydraulic means to hold the rudder positively when same is not being shifted by the motors, and operable also to actuate the rudder, manually operated emergency means located at a distance from the rudder, and operatively connected to said hydraulic means, whereby the rudder can be actuated by said holding device if the electrical driving mechanism should be out of order, and an indicator placed at a distance from the rudder and adjacent to the manually operated emergency means for indicating the position of the rudder.

76. In electric steering apparatus for ships, a rudder, two motors, mechanism forming driving connections between the rudder and the motors, the two motors being adapted to drive said mechanism and thereby actuate the rudder, electrical controlling apparatus for the motors, and means incorporated in the circuits of said controlling apparatus whereby one motor may be held at rest, and permitting only one motor to actuate the mechanism.

77. In electric steering apparatus for ships, a rudder, two motors, mechanism forming driving connections between the rudder and the motors, the two motors being adapted to drive said mechanism and thereby actuate the rudder, electrical controlling apparatus for the motors, and means incorporated in the circuits of said controlling apparatus whereby one motor may be held at rest, and permitting only one motor to actuate the mechanism, and means to start and stop the operating motor for each desired movement of the rudder.

78. In electric steering apparatus for ships, a rudder, two electric motors, intermediate mechanism between the rudder and said motors, a hydraulic holding device for said mechanism, means to control the two motors and cause the same to actuate the rudder, means to render one motor ineffective so that only one motor is operative to actuate the rudder, and means to control the operative motor alone in conjunction with the hydraulic holding device.

79. In electric steering apparatus for ships, the combination of a rudder and two electric motors, intermediate mechanism between the rudder and said motors, said mechanism being actuated differentially when driven by two motors, but also operative to act as a speed reducer when actuated by one motor.

80. In electric steering apparatus for ships, the combination of a rudder and two electric motors, intermediate mechanism between the rudder and said motors, said mechanism being actuated differentially when driven by two motors, but also operative to act as a speed reducer when actuated by one motor, means to effect the actuation of said mechanism either by one or two motors, means to control the mechanism differentially when driven by two motors, and means to start and stop the mechanism each time the rudder is shifted when the mechanism is driven by one motor.

81. In steering apparatus, the combination with a rudder, of a plurality of electric motors, driving mechanism comprising differential gearing between the motors and rudder, resistance in the field circuits of the motors, means for controlling the motors by varying said resistance, means for rendering one of the motors inoperative, and means for controlling the operation of the other motor independently of the field resistance.

82. The combination with a plurality of electric motors, of differential driving mechanism operated by said motors, a device operated by said mechanism, resistance in the field circuits of the motors, means for varying the relative amount of said resistance in the motor circuits, and thereby varying the relative speeds of the motors, means for short-circuiting said resistance, means for preventing the operation of one of the motors, and means for controlling the operation of the other motor when said resistance is short-circuited and the first motor is inoperative.

83. The combination with two dynamo-electric machines connected to normally run in opposite directions at the same rates of speed, of starting and accelerating apparatus for said dynamo-electric machines, said accelerating apparatus comprising electromagnets connected in series with each other across the main lines, and means for varying the relative speeds of said dynamo-electric machines.

84. The combination with two motors connected in parallel with each other, of starting resistance for said motors, accelerating electromagnetic switches for gradually short-circuiting said resistance to increase the speed of said motors, said electromagnetic switches comprising windings connected in series with each other in a circuit across the main lines, reversing means for said motors, and means for disconnecting each motor to permit the other motor being operated alone.

In testimony whereof, I have signed my name to this specification in the presence of two subscribing witnesses.

AUGUST SUNDH.

Witnesses:
CHARLES M. NISSEN,
WALTER C. STRANG.